United States Patent
Knieser et al.

(10) Patent No.: US 6,583,374 B2
(45) Date of Patent: Jun. 24, 2003

(54) MICROELECTROMECHANICAL SYSTEM (MEMS) DIGITAL ELECTRICAL ISOLATOR

(75) Inventors: Michael J. Knieser, Richmond Heights, OH (US); Richard D. Harris, Solon, OH (US); Robert J. Kretschmann, Bay Village, OH (US); Ernst H. Dummermuth, Chesterland, OH (US); Patrick C. Herbert, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 92 days.

(21) Appl. No.: 09/788,928

(22) Filed: Feb. 20, 2001

(65) Prior Publication Data

US 2002/0125117 A1 Sep. 12, 2002

(51) Int. Cl.$^7$ .......................... B81B 7/04; G01P 15/00; H01N 1/00; H01L 29/96
(52) U.S. Cl. .............. 200/181; 73/514.19; 73/514.16; 73/514.26; 73/514.32; 73/514.33; 73/514.34; 310/306; 310/309; 438/50; 257/415
(58) Field of Search .............................. 200/181, 600; 257/415–420; 73/488–514, 39; 438/50, 52, 53; 333/101–108, 262; 335/5, 78; 324/17 R, 99 R, 259, 260; 310/306, 307, 309; 361/233, 234

(56) References Cited

U.S. PATENT DOCUMENTS

| | | | |
|---|---|---|---|
| 5,506,175 A | * | 4/1996 | Zhang et al. .................... 216/2 |
| 5,578,755 A | * | 11/1996 | Offenberg ................ 73/514.32 |
| 5,578,976 A | | 11/1996 | Yao |
| 5,761,350 A | | 6/1998 | Koh |
| 5,783,340 A | | 7/1998 | Farino et al. |
| 5,804,314 A | | 9/1998 | Field et al. |
| 5,903,380 A | | 5/1999 | Motamedi et al. |
| 5,959,516 A | | 9/1999 | Chang et al. |
| 5,995,688 A | | 11/1999 | Aksyuk et al. |
| 6,046,066 A | | 4/2000 | Fang et al. |
| 6,060,336 A | * | 5/2000 | Wan ............................ 438/50 |
| 6,071,426 A | | 6/2000 | Lee et al. |

(List continued on next page.)

OTHER PUBLICATIONS

Toumazou, C. et al., n–step Charge Injection Cancellation Scheme for Very Accurate Switched Current Circuits, Electronic Letters, V.30 (9) 680–681: Jan.–1994.

Emmerich, H., et al., A Novel Micromachined Magnetic–Field Sensor, MEMS 99 IEEE Conference, Jan. 17–21, 1999, IEEE Catalog No. 99ch36291c.

Madou, Marc, Fundamentals of Microfabrication, Chapters 2–4, CRC Press LLC, Boca Raton, FL: Jan.–1997.

Kovacs, Gregory T.A., Micromachined Transducers Sourcebook, Table of Contents, pp. 77–119 and Index, WCB McGraw–Hill, U.S.A.: Jan.–1998.

Teegarden, Darrell et al., How to Model and Simulate Microgyroscope Systems, IEEE Spectrum, 66–75, Jul. 1998.

(List continued on next page.)

Primary Examiner—J. R. Scott
(74) Attorney, Agent, or Firm—Quarles & Brady; Alexander M. Gerasimow; William R. Walbrun

(57) ABSTRACT

A microelectricalmechanical system (MEMS) digital isolator may be created in which an actuator such as an electrostatic motor drives a beam against a predefined force set, for example, by another electrostatic motor. When the threshold of the opposing force is overcome, motion of the beam may be sensed by a sensor also attached to the beam. The beam itself is electrically isolated between the locations of the actuator and the sensor. The structure may be incorporated into integrated circuits to provide on-chip isolation.

29 Claims, 4 Drawing Sheets

U.S. PATENT DOCUMENTS

| | | | |
|---|---|---|---|
| 6,094,102 | A | 7/2000 | Chang et al. |
| 6,100,477 | A | 8/2000 | Randall et al. |
| 6,114,794 | A | 9/2000 | Dhuler et al. |
| 6,137,206 | A | 10/2000 | Hill |
| 6,144,545 | A * | 11/2000 | Lee et al. ............... 200/181 X |
| 6,159,385 | A | 12/2000 | Yao et al. |
| 6,188,322 | B1 * | 2/2001 | Yao et al. ............... 324/658 X |
| 6,198,145 | B1 * | 3/2001 | Ferrari et al. ............... 257/415 |
| 6,232,841 | B1 | 5/2001 | Bartlett et al. |
| 6,232,847 | B1 | 5/2001 | Marcy, 5th et al. |
| 6,291,875 | B1 * | 9/2001 | Clark et al. ................ 257/499 |
| 6,307,169 | B1 * | 10/2001 | Sun et al. ................... 200/181 |
| 6,313,562 | B1 * | 11/2001 | Barnes et al. ............... 310/306 |
| 6,348,788 | B1 * | 2/2002 | Yao et al. ................. 324/99 R |
| 6,384,353 | B1 * | 5/2002 | Huang et al. ............... 200/181 |
| 6,411,214 | B1 * | 6/2002 | Yao et al. ................... 340/664 |
| 6,417,743 | B1 * | 7/2002 | Mihailovich et al. ..... 333/24 C |
| 6,463,339 | B1 * | 10/2002 | Vasko ......................... 700/18 |
| 6,466,005 | B1 * | 10/2002 | Yao et al. ............... 324/117 R |
| 6,504,356 | B2 * | 1/2003 | Yao et al. ................. 324/99 R |

OTHER PUBLICATIONS

Emmerich, Harald et al., Magnetic Field Measurements with a Novel Surface Micromachined Magnetic–Field Sensor, IEEE Transactions on Electron Devices, V. 47 (5) 972–977, May 2000.

McGruer, N.E. et al., Electrostatically Actuated Microswitches; Scaling Properties, Solid–State Sensor and Actuator Workshop, Hilton Head Island, South Carolina, Jun. 8–11, 1998, pp. 132–135.

Miyajima, Hiroshi et al., High–Aspect–Ratio Photolithography for MEMS Applications, J. of Microelectromechanical Sys., V.4(4) 220–229, Dec. 1995.

Lu, Crist et al., A Monolithic Surface Micromachined Accelerometer with Digital Output, IEEE J. of Solid State Circuits, V. 30 (12) 1367–1373, Dec. 1995.

Chen, Ming–Jer et al., Weak Inversion Charge Injection in Analog MOS Switches, IEEE J. of Solid–State Circuits, V. 30 (5) 604–606, May 1995.

Lemkin, Mark A. et al., A Fully Differential Lateral S? Accelerometer with Drift Cancellation Circuitry, Solid–State Sensor and Actuator Workshop, Hilton Head, South Carolina, Jun. 2–6, 1996, pp. 90–93.

Boser, Bernhard E. et al., Surface Micromachined Accelerometers, IEEE J. of Solid–State Circuits, V. 31 (3) 366–375, Mar. 1996.

Fedder, Gary K. et al., Multimode Digital Control of a Suspended Polysilicon Microstructure, J. of Microelectromechanical Sys., V. 5 (4) 283–297, Dec. 1996.

Noriega, Gerardo, Sigma–Delta A/D Converters–Audio and Medium Bandwidths, Technical Notes–DT3 from RMS Instruments website: www.rmsinst.com, 6 pages, Feb. 1996.

Internet page: Decimator Filter DLL, NeuroDimension Inc.: www.nd.com , May 31, 2001.

U.S. patent application No.: 09/406,654, filed on Sep. 27, 1999.

U.S. patent application No.: 09/400,125, filed on Sep. 21, 1999.

U.S. patent application No.: 09/406,509, filed on Sep. 28, 1999.

U.S. patent application No.: 09/955,493, filed on Sep. 18, 2001.

U.S. patent application No.: 09/955,494, filed on Sep. 18, 2001.

U.S. patent application No.: 09/675,861, filed on Sep. 29, 2000.

* cited by examiner

MICROELECTROMECHANICAL SYSTEM (MEMS) DIGITAL ELECTRICAL ISOLATOR

CROSS REFERENCE TO RELATED APPLICATIONS

This application is based on application Ser. No. 09/406,364 filed Sep. 28, 1999 and entitled "METHOD FOR SENSING ELECTRICAL CURRENT" and claims the benefit thereof.

FIELD OF THE INVENTION

The present invention relates to electrical isolators and in particular to a microelectromechanical system (MEMS) device providing electrical isolation in the transmission of digital signals.

BACKGROUND OF THE INVENTION

Electrical isolators are used to provide electrical isolation between circuit elements for the purposes of voltage level shifting, electrical noise reduction, and high voltage and current protection.

Circuit elements may be considered electrically isolated if there is no path in which a direct current (DC) can flow between them. Isolation of this kind can be obtained by capacitive or inductive coupling. In capacitive coupling, an electrical input signal is applied to one plate of a capacitor to transmit an electrostatic signal across an insulating dielectric to a second plate at which an output signal is developed. In inductive coupling, an electrical input signal is applied to a first coil to transmit an electromagnetic field across an insulating gap to a second coil which generates the isolated output signal. Both such isolators essentially block steady state or DC electrical signals.

Such isolators, although simple, block the communication of signals that have significant low frequency components. Further, these isolators can introduce significant frequency dependent attenuation and phase distortion in the transmitted signal. These features make such isolators unsuitable for many types of signals including many types of high-speed digital communications.

In addition, it is sometimes desirable to provide high voltage (>2 kV) isolation between two different portions of a system, while maintaining a communication path between these two portions. This is often true in industrial control applications where it is desirable to isolate the sensor/actuator portions from the control portions of the overall system. It is also applicable to medical instrumentation systems, where it is desirable to isolate the patient from the voltages and currents within the instrumentation.

The isolation of digital signals is frequently provided by optical isolators. In an optical isolator, an input signal drives a light source, typically a light emitting diode (LED) positioned to transmit its light to a photodiode or phototransistor through an insulating but transparent separator. Such a system will readily transmit a binary signal of arbitrary frequency without the distortion and attenuation introduced by capacitors and inductors. The optical isolator further provides an inherent signal limiting in the output through saturation of the light receiver, and signal thresholding in the input, by virtue of the intrinsic LED forward bias voltage.

Nevertheless, optical isolators have some disadvantages. They require a relatively expensive gallium arsenide (GaAs) substrate that is incompatible with other types of integrated circuitry and thus optical isolators often require separate packaging and assembly from the circuits they are protecting. The characteristics of the LED and photodetector can be difficult to control during fabrication, increasing the costs if unit-to-unit variation cannot be tolerated. The power requirements of the LED may require signal conditioning of the input signal before an optical isolator can be used, imposing yet an additional cost. While the forward bias voltage of the LED provides an inherent noise thresholding, the threshold generally cannot be adjusted but is fixed by chemical properties of the LED materials. Accordingly, if different thresholds are required, additional signal conditioning may be needed.

Particularly in the area of industrial controls where many isolated control points are required, the use of optical isolators may be very costly or impractical.

BRIEF SUMMARY OF THE INVENTION

The present invention provides a mechanical isolator manufactured using MEMS techniques and suitable for transmitting digital signals. A special fabrication process forms a microscopic beam whose ends are insulated from each other. One end of the beam is connected to a microscopic actuator which receives an input signal to move the beam against a biasing force provided by a biased device. The other isolated end of the beam is attached to a sensor detecting movement of the beam only when the actuator force exceeds the countervailing force of the biased device. The small scale of the total device provides inexpensive, fast and reliable response.

Specifically, the present invention provides a microelectromechanical system digital isolator having a substrate and an element supported by the substrate for movement between the first and second position with respect to the substrate. At least a portion of the element between a first and second location on the element is an electrical insulator to electrically isolate the first and second locations from each other. An actuator is attached to the first portion of the element to receive an input electrical signal and exert a force dependent on the input electrical signal urging the element toward the second position. A bias structure is attached to the element to exert a predetermined opposite force on the element urging the element toward the first position. Finally, a sensor is attached to the second portion of the element to provide an output electrical signal indicating movement of the element between the first position and the second position whereby an input signal above a predetermined magnitude overcomes the opposite force to cause the element to move rapidly from the first to the second position to produce the output electrical signal electrically isolated from the input electrical signal.

It is one object of the invention to produce a simple mechanical isolation system using MEMS techniques suitable for a wide variety of binary signals and yet which overcomes many of the disadvantages of current optical isolators in costs, interdevice consistency, and incompatibility with other integrated circuit components. In addition, the present invention requires no preconditioning of the input signal. The voltage or current is applied directly to the device with no pre-processing.

The actuator may be an electrostatic motor or a Lorenz force motor or a piezoelectric motor or thermal-expansion motor or a mechanical displacement motor.

It is therefore another object of the invention to provide an isolator that may receive a variety of different electrical signals that may not be compatible with an optical isolator LED, for example, those having a voltage of less than 0.7 volts.

Similarly, the bias structure may be an electrostatic motor, a Lorenz force motor, a piezoelectric motor, a thermal-expansion motor, a mechanical displacement motor, or a mechanical spring.

Thus the invention may provide both for an extremely simple force biasing that requires no electrical connection (e.g. a mechanical spring) or an adjustable bias structure that allow the threshold of activation of the device to be freely tailored to different circumstances. In this way, unlike with optical isolators, an input threshold voltage may be tailored to the particular application.

The sensor may be a capacitive sensor or a piezoelectric sensor or a photoelectric sensor or a resistive sensor or an optical switching sensor.

It is therefore another object of the invention to provide flexible variety of sensing techniques suitable for different purposes.

The travel of the element may be limited by stops to between the first and second position.

In this way, the invention may provide signal limiting comparable to that provided by an optical isolator for signals beyond the threshold needed to trigger the device.

In one embodiment of the invention, the element may be a beam attached to the substrate for sliding motion between the first and second positions. The beam may be supported by flexing transverse arm pairs attached at longitudinally opposed ends of the beam to extend outward therefrom.

Thus it is another object of the invention to provide a simple mechanism that may be implemented on a microscopic scale using MEMS technologies for supporting an element for motion.

The flexing transverse arms may include a cantilevered first portion having first ends attached to the beam and second ends attached to an elbow portion removed from the beam and a cantilevered second portion substantially parallel to the first portion and having a first end attached to the substrate proximate to the beam and a second end attached to the elbow portion. Further the beam and the transverse arms may be symmetric across a longitudinal beam access.

Thus it is another object of the invention to provide a microscopic structure that is resistant to thermal expansion due to processing temperatures or changes in the operating temperature. The symmetry ensures that the beam remains centered with thermal expansion while the doubling back of the flexible transverse arms provides for a degree of cancellation of thermal expansion of these arms.

The flexing transverse arms may attach to the substrate through a spring section allowing angulation of the ends of the transverse arms with respect to the substrate.

It is thus another object of the invention to allow an effective pivoting of the flexible transverse arms so as to decrease the stiffness of the beam structure.

One embodiment of the invention may include a magnetic field, which may be produced by a magnet, crossing the beam and at least one flexing transverse arm may be conductive to an electrical signal and exert a force dependent on the electrical signal urging the beam toward a position.

It is thus another object of the invention to provide that the same structure used to support the beam may provide for its actuation or bias.

The beam may include transverse extending primary capacitor plates attached to the beam and extending out from the beam proximate to secondary capacitor plates. The effective area of the primary capacitor plates may be equal across the longitudinal axis of the beam and the capacitor plates may be attached to the beam between attachment points of at least two of the flexing transverse arm pairs. In one embodiment, the capacitors may include interdigitated fingers. Parallel plate capacitors will also work although they have less linearity.

Another object of the invention is to provide a method for the integration of an electrostatic motor to the isolator in a way that balanced and well-supported forces may be obtained.

The primary capacitor plates may be positioned with respect to the secondary capacitor plates so as to draw the primary capacitor plates toward the secondary capacitor plates on one side of the beam while to separate the primary capacitor plates from the secondary capacitor plates on the other side of the beam. Conversely, the capacitor plates may be positioned so that all draw together with a given motion.

Thus it is another object of the invention to allow the capacitor plates to be used as a sensor in which a comparison of capacitance values reveals a position of the beam or as an electrostatic motor.

The beam may include a first and second micro-machined layer, the first of which is insulating to provide the portion of the electrical insulator in a region where the second layer is removed.

Thus it is another object of the invention to provide a simple method for forming insulating and conductive elements required by the present invention.

The electrical insulator of the beam may be between the actuator and the bias structure or between the bias structure and the sensor or both.

It is a further object of the invention to provide that the biasing circuit may be placed on either side of the isolation or to provide redundant isolation for greater total isolation.

The digital isolator may include a second sensor at a first portion of the element to provide a second output electrical signal indicating movement of the element to the second position, the output electrical signal being electrically isolated from the output electrical signal.

Thus it is another object of the invention to provide for an isolator that produces a signal indicating movement of the beam and thus operation of the isolator from the isolated side.

The isolator may further include a second actuator as a second portion of the element to receive a second input signal and exert a force dependent on the second input electrical signal urging the element toward the second position.

Thus it is another object of the invention to provide for a bi-directional electrical isolator suitable for use with bi-directional data lines.

The foregoing objects and advantages may not apply to all embodiments of the inventions and are not intended to define the scope of the invention for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

Figure 1:
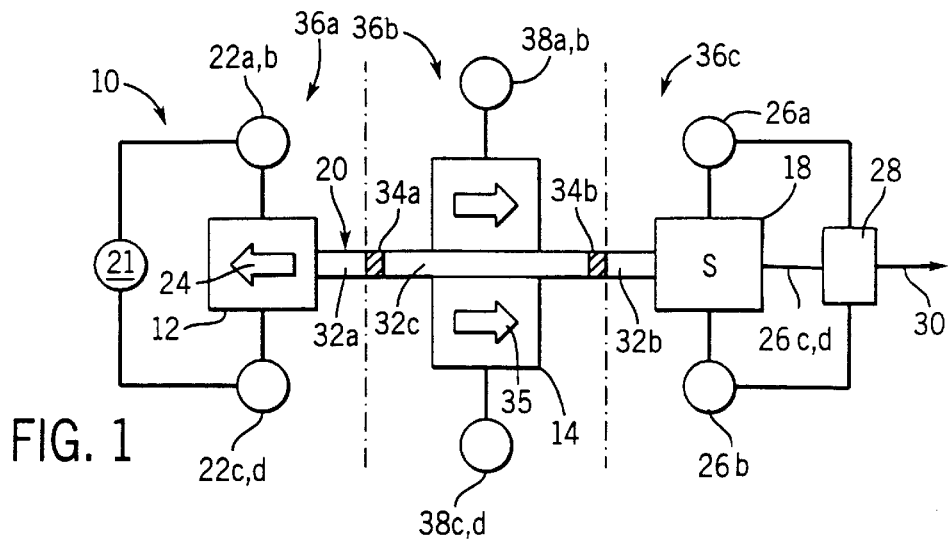
FIG. 1 is a simplified block diagram of the present digital isolator showing its elements of an actuator, a bias structure and a sensor communicating along a single mechanical element that may move to transmit data between the actuator and sensor and showing insulating portions of the moving element.

Referring now to FIG. 1, a MEMS digital isolator 10 per the present invention includes an actuator 12, bias structure 14, and a sensor 18 mechanically interconnected by a movable beam 20.

The actuator 12 includes terminals 22a and 22b and (22c, 22d) through which an electrical input signal 21 may be received and converted into a mechanical force tending to move the beam 20 in an actuation direction 24 indicated by an arrow. In the microscopic scale of the MEMS digital isolator 10, the actuator 12 may be a piezoelectric actuator, a thermal-expansion motor, a mechanical-displacement motor, an electrostatic motor or a Lorenz force motor generally known in the art, the latter two to be described in more detail below. For a Lorenz force motor or thermal-expansion motor, the electrical input signal 21 will be a current, for the piezoelectric or electrostatic motor, the input electrical signal will be a voltage.

The actuator 12 communicates with a first end of the beam 20. An opposite-end of the beam 20 is received by the sensor 18 which detects movement of the beam 20 and, through its terminals 26a, 26b and (22c, 22d), produces an electrical signal that may be measured directly or further processed by processing electronics 28 to produce the output signal 30 indicating movement of the beam 20. The sensor 18 may be a piezoelectric-type sensor, a photoelectric sensor, a resistive sensor, an optical switching sensor, or a capacitive sensor according to techniques known in the art of MEMS design. In the preferred embodiment, the sensor 18 uses counterpoised movable plate capacitors as will be described in more detail below.

Attached to the beam 20 between the actuator 12 and sensor 18 is the bias structure 14 which provides a force on the beam 20 opposite the actuation direction 24 as indicated by arrows 35 and tending to resist the operation of the actuator 12.

Absent an electrical input signal 21, the bias structure 14 holds the beam in a position toward the sensor 18. Ideally, the bias structure 14 provides a force that is fixed or that decreases slightly with motion of the beam 20 in the actuation direction 24. In this way, a precisely defined threshold is created for the actuation force. Electrical input signal 21 inducing a force on the beam slightly below the force produced by the bias structure 14 will cause no motion of the beam 20. In one embodiment, electrical input signal 21 inducing a force even slightly above that produced by the bias structure 14 will cause a rapid and complete movement of the beam 20 to its further extent in the actuation direction 24. Alternative embodiments may provide for linear or non-linear behavior including but not limited to hysteresis in the movement of the beam 20 using mechanical or electrical techniques. In this way, a binary signal imposed on the electrical input signal 21 is unambiguously converted into movement of the beam 20 to one extreme in the actuation direction 24 or the other. The MEMS digital isolator 10 provides extremely low friction and inertia so this movement is both extremely well defined and rapid.

As will be described, the force provided by the bias structure 14 may be adjustable by varying a current or voltage to the structure. In the case where the force on the bias structure 14 is adjustable, it is desirably set so that the bias force is the midpoint between defined high and low values of the force produced by the electrical input signal 21. If the structures used to implement the actuator 12 and bias structure 14 are essentially the same and the input and bias are current, the current applied to the bias structure may be approximately set to equal half the desired range of the input current electrical input signal 21. If the structures used to implement the actuator 12 and bias structure 14 are essentially the same and the input and bias are voltage, the voltage applied to the bias structure may be approximately set so that its square is equal to the midpoint of the squares of the high and low values of the desired range of the input voltage electrical input signal 21. Note, generally, the electrostatic force is proportional to $V^2$. Thus, for example, if: V(low)=0, V(high)=10, the squares are 0 and 100, so V(bias) should be the square root of 50=7.1, if the actuator 12 and the bias structure 14 are constructed the same.

The invention also will work with a less than ideal bias structure 14 such as a regular spring where a constant force opposite the actuation direction 24 is not realized but where the force provided by the bias structure 14 increases slightly with movement of the beam 20 in the actuation direction.

In yet an alternative embodiment, the biasing force could be provided by a prestressing of flexing arm pairs 46 to operate like an over-center spring whose force of resistance drops off sharply with motion against that force (like a child's clicker). The flexing arm pair 46, thus configured, could add latching to the structure. The bias structure 14 now could be used to reset the latching. Building the flexing arm pairs 46 in a curve could thus add bias without the need for the bias capacitive motor.

Alternatively, a "snap action" could be obtained by using non-symmetrical bias capacitor fingers 66 and 68 or parallel plates. As mentioned above, parallel plates have a square-law force/displacement characteristic. The same effect can be obtained with the capacitor fingers by graduating the longitudinal length of the fingers as one moves transversely.

The beam 20 includes conductive portions 32a and 32b located at the actuator 12 and sensor 18, respectively, and such as may form part of the actuator 12 or sensor 18. Insulating portions 34a and 34b separate conductive portions 32a and 32b from a centermost conductive portion 32c that may be part of the bias structure 14; the insulating portions 34a and 34b thus defining three regions of isolation 36a–c. The first region 36a includes the actuator 12 and conductive portion 32a, the second region 36b includes the center conductive section 32c and the bias structure 14, and the third region 36c includes the conductive section 32b and sensor 18.

The insulated beam 20 provides a mechanism by which the electrical input signal 21 acting through the actuator 12 may produce a corresponding output signal 30 from the sensor 18 electrically isolated from the electrical input signal 21. The bias structure 14 may be electrically isolated from either the input signal and/or the output signal 30.

The bias structure 14 is preferably an electrostatic motor or a Lorenz force motor of a type that will be described below. For these latter two electronic bias structures, terminals (38a, 38b) and (38c, 38d) are provided to provide a voltage or current dictating the countervailing force provided by the bias structure 14. Thus the precise threshold at which the digital isolator changes state from unactuated to actuated may be tailored for the particular circumstance, an option not available in optical isolators.

Figure 2:
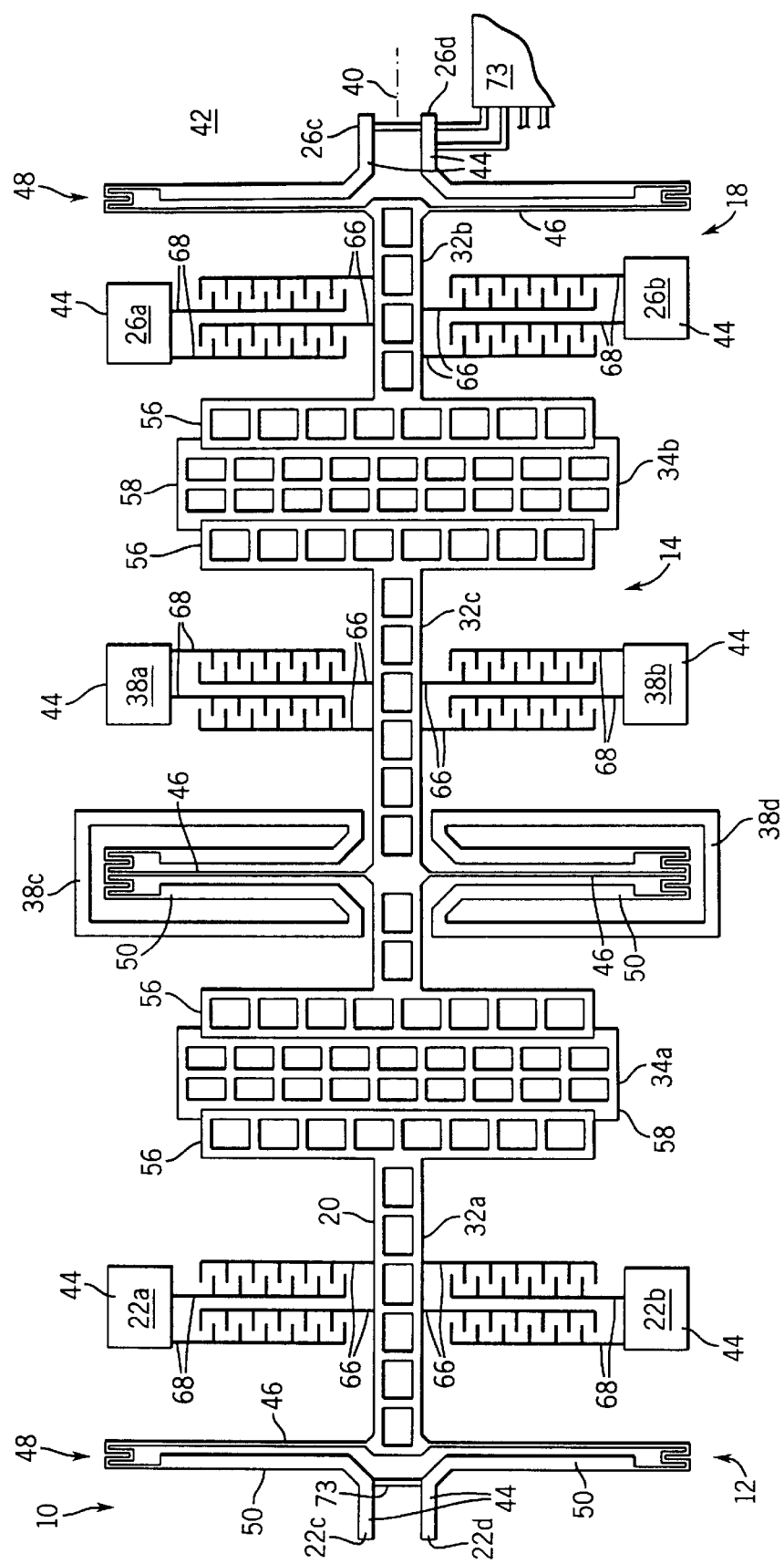
FIG. 2 is a top plan view of one embodiment of the isolator of FIG. 1 using two counterpoised electrostatic motors and a capacitive sensor showing support of a moving beam connecting these components by means of flexible transverse arms and showing implementation of the insulating sections of the beam.

Referring now to FIG. 2, the beam 20 may extend above a substrate 42 along a longitudinal axis 40 passing along a midline between transversely opposed pylons 44 attached to a substrate 42. The pylons form the terminals 22a, 22b, 22c, 22d, 26a, 26b, 26c, 26d, 38a, 38b, 38c and 38d described above.

Ideally, the substrate 42 is an insulating substrate and thus pylons 44 are all mutually isolated and particular conductive layers are placed to make the necessary connections.

The beam 20 is supported away from the substrate 42 and held for movement along the longitudinal axis 40 by means of flexing arm pairs 46 extending transversely on opposite sides of both ends of the beam 20 and its middle. The flexing arms 46 extend away from the beam 20 to elbows 48 transversely removed from the beam 20 on each side of the beam 20. The elbows 48 in turn connect to expansion compensators 50 which return to be attached to the substrate 42 at a point near the beam 20. These expansion compensators 50 are not absolutely required. They serve as stress relief if that is needed. The flexing transverse arms 46 are generally parallel to the expansion compensators 50 to which they are connected. The flexing transverse arms 46, elbows 48 and expansion compensators are conductive to provide electrical connections between the conductive portions 32a, 32b, and 32c and stationary electrical terminals (not shown).

Figure 4:
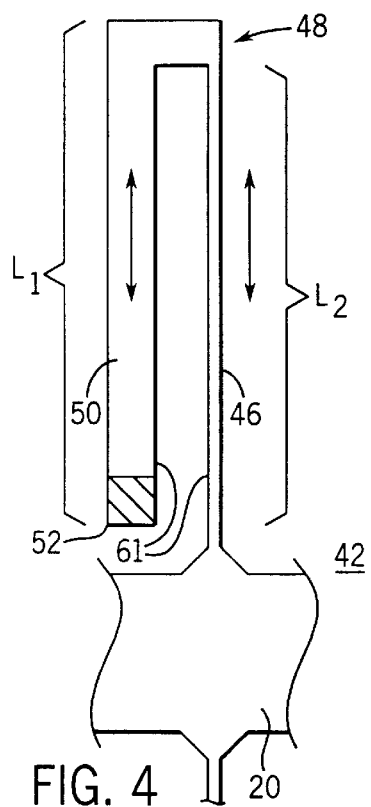
FIG. 4 is a fragmentary view of one transverse arm of FIG. 2 showing a doubling back of the arm at an elbow so as to reduce the effects of expansion caused by thermal changes.

Referring momentarily to FIG. 4, stops 61 may be added between the flexing transverse arm 46 and the expansion compensators 50 or other stationary structure so as to prevent overtravel of the beam 20 effectively limiting or clamping the output of the digital isolator in a manner analogous to that provided by other isolation techniques.

Referring now to FIG. 4, the length $L_1$ of each expansion compensator 50 between its point of attachment 52 to the substrate 42 and its connection to a corresponding flexing transverse arm 46 at elbow 48 and the length $L_2$ of the flexing transverse arm 46 defined as the distance between its connection to beam 20 and the elbow 48 are set to be nearly equal so that expansion caused by thermal effects in the flexing transverse arm 46 is nearly or completely canceled by expansion in the expansion compensator 50. In this way, little tension or compression develops in the flexing transverse arm 46. Both the flexing transverse arm 46 and the expansion compensator 50 in this embodiment are fabricated of the same material, however it will be understood that different materials may also be used and lengths $L_1$ and $L_2$ may be adjusted to reflect the differences in thermal expansion coefficients.

Figure 5A:
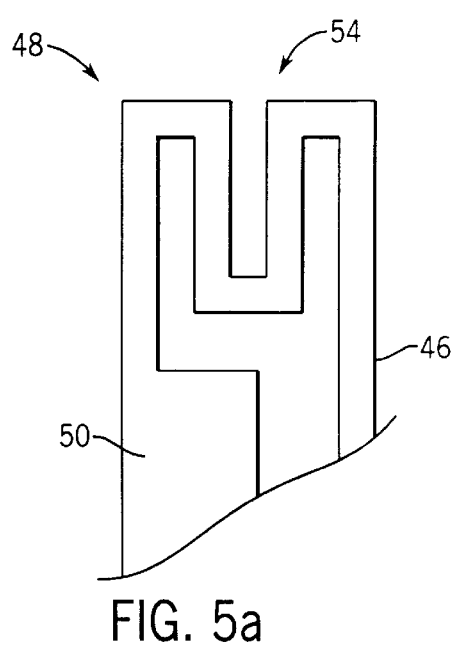
FIGS. 5a and 5b are fragmentary detailed views of the elbow of FIG. 4 showing the incorporation of a spring allowing angulation of the portion of the transverse arm attached to the beam for improved force characteristics.
Figure 5B:
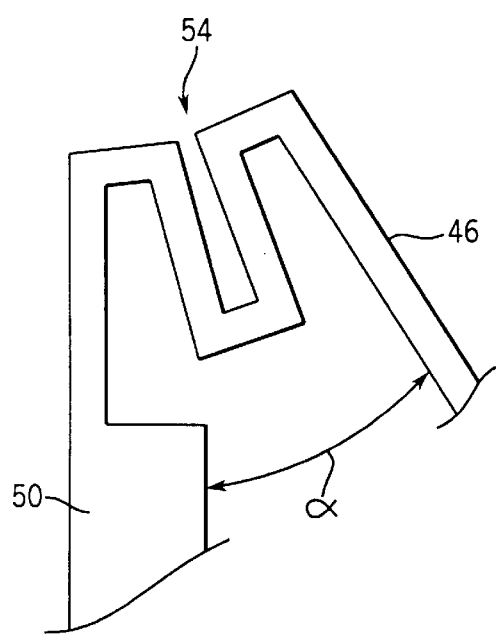

Referring to FIG. 5a, the elbow 48 may include a serpentine portion 54 extending longitudinally from the expansion compensator 50 to its flexing transverse arm 46. As shown in FIG. 5b, the serpentine portion 54 allows angulation α between the flexing transverse arm 46 and expansion compensator 50 such as provides essentially a radius adjusting pivot, both decreasing the force exerted by the flexing transverse arm pairs 46 on the beam 20 with movement of the beam 20 and decreasing the stiffness of the structure.

Figure 3:
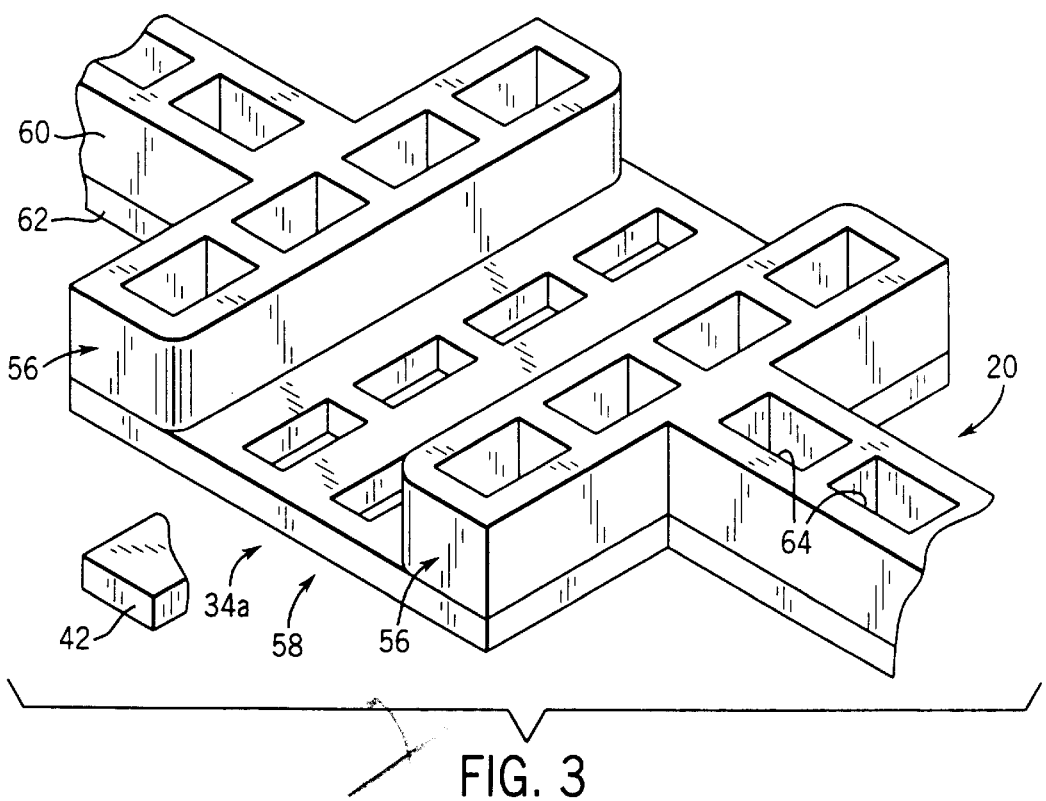
FIG. 3 is a simplified perspective view of an insulating section of the beam of FIG. 2 showing the use of laminated conductive and nonconductive layers and the removal of the conductive layer to create the insulating section.

Referring again to FIGS. 2 and 3, in between the flexing transverse arm pairs 46, the beam 20 expands to create T-bars 56 flanking insulating portions 34a and 34b. Insulating material 58 attached to these T-bars 56 create the insulating portions 34. Generally the beam 20 may be fabricated using well-known integrated circuit processing techniques to produce a structure suspended above the substrate 42 and composed of a laminated upper conductive layer 60 (for example, polysilicon or crystalline silicon optionally with an upper aluminum layer) and a lower insulating layer 62 such as silicon dioxide or silicon nitride. The insulating portions 34 may be obtained simply by etching away the upper layer in the region 34a or 34b according to techniques well-known in the art using selective etching techniques. An improved method of fabricating these structures is described in application Method for Sensing Current, Ser. No. 09/406,364 filed Sep. 28, 1999 now U.S. Pat. No. 6,188,322 and hereby incorporated by reference.

Each of the upper conductive layers 60 and lower insulating layers 62 are perforated by vertically extending channels 64 such as assists in conducting etchant beneath the layers 60 and 62 to remove a sacrificial layer that normally attaches layers 60 and 62 to the substrate 42 below according to techniques well known in the art.

Referring now to FIG. 2 again, section 32a of the beam 20 such as provides a portion of the actuator 12, may have transversely outwardly extending, moving capacitor plates 66 overlapping with corresponding transversely inwardly extending stationary capacitor plates 68 attached to the pylons 44 representing terminals 22a, 22b, 22c and 22d and. Each of the moving capacitor plates 66 and their corresponding stationary capacitor plates 68 may have mutually engaging fingers so as to provide for a more uniform electrostatic force over a greater range of longitudinal travel of the beam 20. The capacitor plates could also be simple parallel plate arms, which would have less linearity than the mutually engaging fingers. The thus formed electrostatic motor operates using the attraction between the capacitor plates 66 and 68 with the terminals (22a, 22b) and (22c, 22d) connected to a more positive voltage than that of beam 20 to urge the beam 20 in the actuation direction 24. For this reason, stationary capacitor plates 68 are after the moving capacitor plates 66 on both sides of the beam 20 as one travels along the actuation direction. Capacitor plates 66 and 68 are cantilevered over the substrate 42 by the same under etching used to free the beam 20 from the substrate 42.

The pylons 44 flanking section 32c of the beam such as form pads 38a, 38b, 38c and 38d likewise include moving and stationary capacitor plates 66 and 68. As noted, this section provides the bias structure 14 and as such, the electrostatic motor created operates in the opposite direction to the actuator 12 with the moving capacitor plates 66 following the stationary capacitor plates 68 as one moves in the actuation direction 24.

The mutual area of the capacitor plates 66 and 68 and their separation for an unactuated position of the beam 20, for the actuator 12 and bias structure 14, may be substantially equal so that the voltage on the bias structure pads (38*a*, 38*b*) and (38*c*, 38*d*) approximately define the threshold over which the input voltage on terminals (22*a*, 22*b*) and (22*c*, 22*d*) must pass in order to actuate the MEMS digital isolator 10.

Referring still to FIG. 2, section 32*b* of the beam also supports moving capacitor plates 66 and stationary capacitor plates 68. However in this case, the capacitor plates do not serve the purpose of making an electrostatic motor but instead serve as a sensing means in which variation in the capacitance between the moving capacitor plates 66 and stationary capacitor plates 68 serves to indicate the position of the beam 20. In this regard, the order of the stationary and moving capacitor plates 66 and 68 is reversed on opposite sides of the beam 20. Thus, the moving capacitor plates 66 are right of the stationary capacitor plates 68 on a first side of the beam (the upper side as depicted in FIG. 2) "downstream" with respect to the actuation direction 24 whereas the reverse order occurs on the lower side of the beam 20 with the moving capacitor plates 66 are left of the stationary capacitor plates 68. Accordingly as the beam 20 moves in the actuation direction 24, the capacitance formed by the upper moving capacitor plates 66 and stationary capacitor plates 68 increases while the capacitance formed by the lower plates decreases. The point where the value of the upper capacitance crosses the value of the lower capacitance precisely defines a null point and is preferably set midway in the travel of the beam 20.

As mentioned above, it is not absolutely necessary that both capacitors are variable. Using a variable capacitor plus a fixed capacitor would provide an alternative embodiment where the same qualitative affect on the voltage at the center tap is realized. Having both capacitors move in the same direction does not work for the three terminal structure shown in FIG. 2. An alternative method of measuring the capacitances and a different terminal structure, as will be recognized by one of ordinary skill in the art, must be adopted.

Techniques for comparing capacitance well known in the art may be used to evaluate the position of the beam 20. One circuit for providing extremely accurate measurements of these capacitances is described in application Ser. No. 09/677,037 filed Sep. 29, 2000 and hereby incorporated by reference.

Generally, the operating structure of the MEMS digital isolator 10 is constructed to be generally symmetric about an axis through the middle of the beam 20 along the longitudinal axis 40 such as to better compensate the thermal expansions. In addition, the operating area of the plates of the capacitors plates 66 and 68 on both sides of the beam 20 for the actuator 12 and the bias structure 14 are made equal so as to be balanced. For similar reasons, the capacitors of the electrostatic motors and the bias structure 14 are placed between flexing transverse arm pairs 46 so as to better control slight amounts of torsion caused by uneven forces between the capacitor plates 66 and 68.

Figure 6:
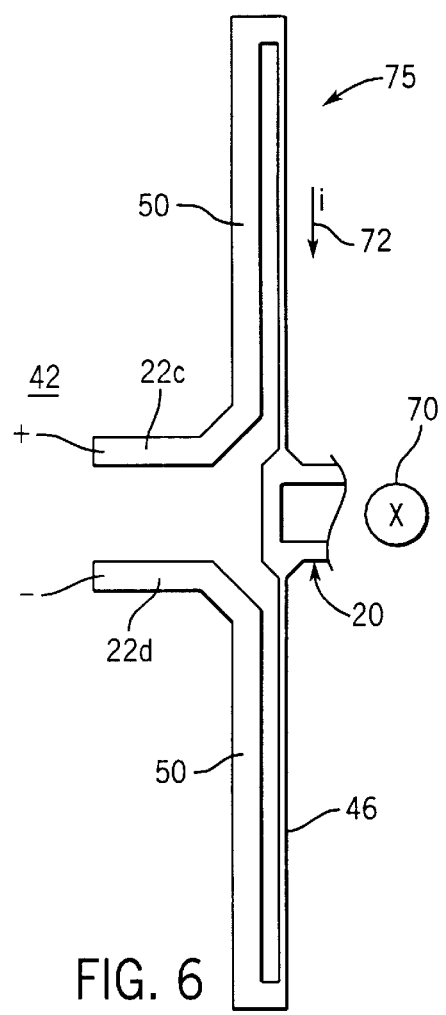
FIG. 6 is a view of one pair of transverse arms of FIG. 2 showing electrical separation of the arms of the pair to allow a current to be imposed on the arm to create a Lorenz force motor such as may be substituted for the electrostatic motors of FIG. 2.

Referring now to FIG. 6, it will be understood that one or both of the electrostatic motors forming the actuator 12 and the bias structure 14, described above, may be replaced with Lorenz-force motors 75 in which forces are generated not by electrostatic attraction between capacitor plates but by the interaction of a current with a magnetic field. In the Lorenz force motor 75, a magnetic field (e.g., using a permanent magnet not shown) may be generated adjacent to the MEMS digital isolator 10 to produce a substrate-normal magnetic flux 70. The expansion compensators 50 supporting the flexing transverse arm 46 on opposite sides of the beam 20 are electrically isolated from each other so that a voltage may be developed across expansion compensators 50 to cause a current 72 to flow through the flexing transverse arm 46. This current flow in the magnetic field generated by the magnet will produce a longitudinal force on the beam 20 that may act in lieu of the electrostatic motors. The amount of deflection is generally determined by the flux density of the magnetic field 70, the amount of current and the flexibility of the flexing transverse arm pairs 46 in accordance with the right hand rule.

Figure 7:
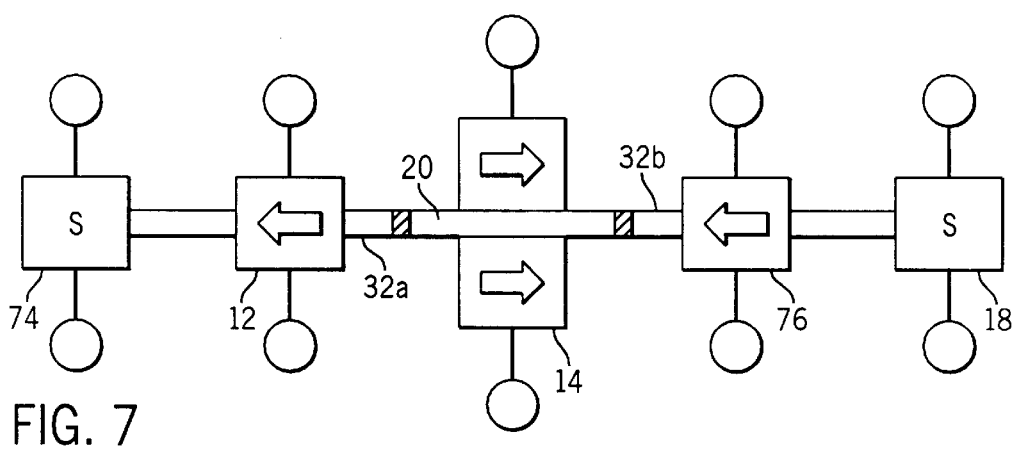
FIG. 7 is a figure similar to that of FIG. 1 showing the addition of a second sensor and second actuator on opposite ends of the beam to allow for a bi-directional isolator or with the additional sensor alone, a high reliability isolator.

Referring now to FIG. 7, the actuator 12 positioned on beam section 32*a*, may be teamed with a second sensor 74 for sensing motion of the beam 20 and that sensor 74 may be used to provide isolated feedback to a device producing the electrical input signal 21 as to motion of the beam 20 such as may be used to ensure greater reliability in the transmission of signals.

Alternatively or in addition, the sensor 18 may be teamed with an actuator 76 having the same orientation of actuator 12 but positioned in isolation section 32*b*. When actuator 76 is teamed with sensor 74, they together provide a bi-directional digital isolator in which isolated signals may be sent from either end of the beam 32 to the other end. It will be understood that another variation of this embodiment may eliminate the bias structure 14 and instead the actuators 76 and 12 may be used during transmission by the other actuator as the bias structure. Such a device might be useful for so-called tri-state or bi-directional input lines.

It will be understood with greater circuit complexity that certain of the elements of the actuator 12, bias structure 14 and sensor 18 may be combined into individual structures and hence, these terms should be considered to cover the functional equivalents of the functions of actuator bias structure 14 and sensor 18 whether or not they are realized as individual structures or not. Further the relative location of the bias structure 14, the actuator 12 and the sensor 18 may be swapped and still provide isolated signal transmission.

Referring again to FIG. 2, MEMS fabrication allows that a portion of the substrate 42 may also include integrated circuits 73 having a number of solid-state devices such as may implement, for example, the capacitor sense circuitry described above. A number of the MEMS digital isolators 10 may be placed on a single integrated circuit with appropriate interconnects made for providing them with the currents required. Generally, using the MEMS digital isolator 10 of the present invention, a single integrated circuit of arbitrary complexity, such as an industrial controller, may include isolators on the same substrate 42 manufactured concurrently with each other. These MEMS digital isolators 10 may provide for either inputs or outputs to the remaining integrated circuitry.

It should be noted that the sensor 18, actuator 12 and bias structure 14 may be located at any relative position on the beam 20 as determined by the demands of the particular application. As an example the input signal could be received by an actuator 12 located in the middle of the beam 20. Generally, symmetry is not necessary.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A micro-electro-mechanical system (MEMS) digital isolator, comprising:
   a substrate;
   an element supported by the substrate for movement between a first and second position with respect to the substrate, where at least a portion of the element between a first and second location on the element is an electrical insulator to electrically isolate the first and second locations from each other;
   an actuator attached to the first portion of the element to receive an input electrical signal and exert a force dependent on the input electrical signal urging the element toward the second position;
   a bias structure attached to the element to exert a predetermined opposite force on the element urging the element toward the first position; and
   a sensor attached to the second portion of the element to provide an output electrical signal indicating movement of the element between the first position and the second position;
   whereby an input signal of above a predetermined magnitude overcomes the opposite force to cause the element to move rapidly from the first to the second position to produce the output electrical signal electrically isolated from the input electrical signal;
   wherein the sensor is selected from the group consisting of a capacitive sensor, a piezoelectric sensor, a photoelectric sensor, a resistive sensor, and an optical switching sensor.

2. The MEMS digital isolator of claim 1 wherein the actuator is selected from the group consisting of: an electrostatic motor, a Lorenz force motor, a piezoelectric motor, a thermal-expansion motor, and a mechanical-displacement motor.

3. The MEMS digital isolator of claim 1 wherein the bias structure is selected from the group consisting of: an electrostatic motor, a Lorenz force motor, a thermal-expansion motor, a mechanical-displacement motor, and a mechanical spring.

4. The MEMS digital isolator of claim 1 wherein the element is a beam attached to the substrate for sliding motion between the first and second positions.

5. The MEMS digital isolator of claim 4 wherein the beam moves with respect to the substrate along a longitudinal axis and including flexing transverse arm pairs attached at longitudinally opposed ends of the beam to extend outward therefrom to support the beam with respect to the substrate.

6. The MEMS digital isolator of claim 5 wherein the flexing transverse arms attached to the substrate at points proximate to the beam and where the flexing transverse arms include:
   (i) cantilevered first potions having first ends attached to the beam and second ends attached to an elbow portion removed from the beam; and
   (ii) cantilevered second portions substantially parallel to the first portions and having first ends attached to the substrate and second ends attached to the elbow portion;
      whereby expansion of the first portion is offset by substantially equal expansion of the second portion to control the amount of stress in the beam.

7. The MEMS digital isolator of claim 5 wherein the flexing transverse arms attach to the substrate through a spring section allowing angulation of the end of the transverse arm with respect to the substrate.

8. The MEMS digital isolator of claim 5 wherein the beam and transverse arms are symmetric across a longitudinal axis.

9. The MEMS digital isolator of claim 5 including further a magnetic field crossing the beam and wherein at least one flexing transverse arm pair is conductive to receive an electrical signal and exert a force dependent on the electrical signal urging the beam toward a position.

10. The MEMS digital isolator of claim 5 including transverse extending primary capacitor plates attached to the beam and extending outward from the beam proximate to secondary capacitor plates.

11. The MEMS digital isolator of claim 10 wherein an effective area of the primary capacitor plates is equal across the longitudinal axis of the beam.

12. The MEMS digital isolator of claim 10 wherein the capacitor plates attach to the beam between the attachment points of at least two of the flexing transverse arm pairs.

13. The MEMS digital isolator of claim 10 wherein the primary capacitor plates are positioned with respect to the secondary capacitor plates so as to draw the primary capacitor plates toward the secondary capacitor plates on one side of the beam while to separate the primary capacitor plates from the secondary capacitor plates on the other side of the beam with a given motion.

14. The MEMS digital isolator of claim 10 wherein the primary capacitor plates are positioned with respect to the secondary capacitor plates so as to draw the primary capacitor plates toward the secondary capacitor plates on both sides of the beam with a given motion.

15. The MEMS digital isolator of claim 10 wherein the beam includes a first and second micro-machined layer, the first of which is insulating to provide the portion of electrical insulator in a region where the second layer is removed.

16. The MEMS digital isolator of claim 1 wherein the portion of electrical insulator of the beam is between the actuator and the bias structure.

17. The MEMS digital isolator of claim 1 wherein the portion of electrical insulator of the beam is between the bias structure and the sensor.

18. The MEMS digital isolator of claim 1 wherein the element is supported for movement along a plane of the substrate.

19. The MEMS digital isolator of claim 1 wherein the first and second locations on the element communicate with stationary terminals attached to the substrate.

20. An isolated circuit module comprising:
   a substrate;
   a plurality of interconnected solid state electronic devices formed on the substrate into an integrated circuit having input and output points;
   a mechanical digital isolator also formed on the substrate and electrically attached to at least one of the integrated circuit input and output points, the mechanical digital isolator including:
      (1) an element supported by the substrate for movement between a first and second position with respect to the substrate, where at least a portion of the element between a first and second location on the element is an electrical insulator to electrically isolate the first and second locations from each other;
      (2) an actuator attached to the first portion of the element to receive an input electrical signal and exert a force dependent on the input electrical signal urging the element toward the second position;

(3) a bias structure attached to the element to exert a predetermined substantially fixed force on the element urging the element toward the first position; and (4) a sensor attached to the second portion of the element to provide an output electrical signal indicating movement of the element to the second position, the output electrical signal being electrically isolated from the input electrical signal;

whereby an input signal of above a predetermined magnitude overcomes the fixed force to cause the element to move rapidly from the first to the second position.

21. The isolated circuit module of claim 19 wherein the actuator of the mechanical digital isolator is attached to at least one output point of the integrated circuit.

22. The isolated circuit module of claim 20 wherein the sensor of the mechanical digital isolator is attached to at least one input point of the integrated circuit.

23. A method of providing electrical isolation of a digital signal to a circuit employing a MEMS digital isolator of a type having:

(i) a substrate;

(ii) an element supported by the substrate for movement between a first and second position with respect to the substrate, where at least a portion of the element between a first and second location on the element is an electrical insulator to electrically isolate the first and second locations from each other;

(iii) an actuator attached to the first portion of the element to receive an input electrical signal and exert a force dependent on the input electrical signal urging the element toward second position;

(iv) a bias structure attached to the element to exert a predetermined substantially fixed force on the element urging the element toward the first position; and (v) a sensor attached to the second portion of the element to provide an output electrical signal indicating movement of the element to the second position, the output electrical signal being electrically isolated from the input electrical signal, the method comprising the steps of:

(1) identifying a logical threshold for an input signal beyond which a logical true is indicated and beneath which a logical false is indicated;

(2) adjusting the bias structure to exert a fixed force on the elements toward the first position sufficient so that the actuator cannot move the element toward the second position for input signals beneath the threshold; and (3) providing an output logical true signal only with movement of the element to the second position.

24. The method of claim 23 wherein the biased device is an electrostatic motor and the force is adjusted by changing a voltage on the electrostatic motor.

25. The method of claim 23 wherein the threshold is a voltage level and wherein the actuator and bias structure are matched electrostatic motors and wherein the voltage on the bias structure is set to the threshold voltage level.

26. The method of claim 23 wherein the bias structure is a Lorenz force motor and the force is adjusted by changing a current through the Lorenz force motor.

27. The method of claim 25 wherein the threshold is a current level and wherein the actuator and bias structure are matched Lorenz motors and wherein the voltage on the bias structure is set to the threshold current level.

28. The MEMS digital isolator of claim 1 including further a second sensor at the first portion of the element to provide a second output electrical signal indicating movement of the element to the second position, the second output electrical signal being electrically isolated from the output electrical signal.

29. The MEMS digital isolator of claim 28 including further a second actuator at the second portion of the element to receive a second input electrical signal and exert a force dependent on the second input electrical signal urging the element toward the second position.

* * * * *